DAVID DALZELL.

Improvement in Axle-Boxes for Vehicle-Wheels.

No. 4,877. Reissued April 23, 1872.

Witnesses.
C. F. Brown.
A. Bently

Inventor:
David Dalzell
by Geo. E. Brown,
Atty.

AM. PHOTO-LITHOGRAPHIC CO. N.Y. (OSBORNE'S PROCESS.)

UNITED STATES PATENT OFFICE.

DAVID DALZELL, OF SOUTH EGREMONT, MASSACHUSETTS.

IMPROVEMENT IN AXLE-BOXES FOR VEHICLE-WHEELS.

Specification forming part of Letters Patent No. 106,469 dated August 16, 1870; reissue No. 4,594, dated October 17, 1871; reissue No. 4,877, dated April 23, 1872.

Specification describing a certain Improvement in Axle-Boxes, invented by DAVID DALZELL, of South Egremont, in the county of Berkshire and State of Massachusetts.

This invention relates to that class of axle-boxes that are made in parts. It consists in an axle-box in which the part that turns on the arm of the axle, and is the only portion subjected to wear, is of wrought-iron, case-hardened; and the other part, which is subjected to no wear, is of cast-iron made malleable—said parts being connected by a screw-joint, or its equivalent.

Figure 1:
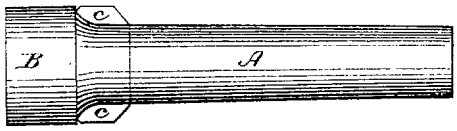
Figure 2:
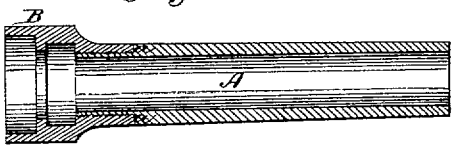
Figure 3:
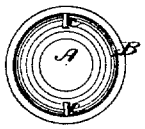

Figure 1 is a side view of my invention; Fig. 2, a longitudinal central section of the same; Fig. 3, an end view.

A represents the outer and main portion of the axle-box, which is constructed of wrought-iron. I prefer wrought-iron tubing as being the least expensive, but do not confine myself to it, reserving the right to use wrought-iron in any form. The exterior of this part A, is turned of slightly taper-form, and its interior is reamed out as true as may be, and made to conform to the shape of the arm of the axle, on which it is designed to turn, said part A being case-hardened to obtain the requisite degree of hardness to resist wear. The inner end of A is turned down a suitable distance of its length to form a shoulder, and a screw-thread is cut on the exterior of the turned down portion to admit of the outer end of the other part, designated B, being screwed upon it. The part B is of malleable cast-iron, and is provided with ears *c c*, to prevent the box from turning within the hub. In order to prevent the two parts being casually unscrewed from each other, a key or pin may be inserted in a seat or hole drilled in the adjoining ends of said parts.

I claim as my invention—

The axle-box, herein described, in which the part A is of wrought-iron, case-hardened, and the part B of malleable cast-iron, said parts being connected by a screw-joint or its equivalent, as specified.

DAVID DALZELL.

Witnesses:

GEO. E. BROWN,

R. H. WHITTLESEY.